(12) United States Patent
Stockert et al.

(10) Patent No.: US 11,349,513 B2
(45) Date of Patent: May 31, 2022

(54) ENVELOPE TRACKING SYSTEM

(71) Applicant: Qorvo US, Inc., Greensboro, NC (US)

(72) Inventors: Terry J. Stockert, Cedar Rapids, IA (US); Nadim Khlat, Cugnaux (FR)

(73) Assignee: QORVO US, INC., Greensboro, NC (US)

( * ) Notice: Subject to any disclaimer, the term of this patent is extended or adjusted under 35 U.S.C. 154(b) by 0 days.

(21) Appl. No.: 17/126,561

(22) Filed: Dec. 18, 2020

(65) Prior Publication Data
US 2021/0194522 A1 Jun. 24, 2021

Related U.S. Application Data

(60) Provisional application No. 62/951,021, filed on Dec. 20, 2019.

(51) Int. Cl.
| | |
|---|---|
| *H04K 1/02* | (2006.01) |
| *H04L 25/03* | (2006.01) |
| *H04L 25/49* | (2006.01) |
| *H04B 1/04* | (2006.01) |

(52) U.S. Cl.
CPC ......... *H04B 1/0475* (2013.01); *H04B 1/0466* (2013.01); *H04B 2001/0416* (2013.01)

(58) Field of Classification Search
CPC ............... H04B 1/0475; H04B 1/0466; H04B 2001/0416
USPC ........................................................ 375/297
See application file for complete search history.

(56) References Cited

U.S. PATENT DOCUMENTS

| | | | |
|---|---|---|---|
| 5,510,753 | A | 4/1996 | French |
| 5,838,732 | A | 11/1998 | Carney |
| 6,107,862 | A | 8/2000 | Mukainakano et al. |
| 6,141,377 | A | 10/2000 | Sharper et al. |
| 6,141,541 | A | 10/2000 | Midya et al. |
| 6,411,531 | B1 | 10/2000 | Midya et al. |
| 6,818,305 | B2 | 11/2004 | Murar et al. |
| 6,985,033 | B1 | 1/2006 | Shirali et al. |
| 7,043,213 | B2 | 5/2006 | Robinson et al. |
| 7,471,155 | B1 | 12/2008 | Levesque |
| 7,570,931 | B2 | 8/2009 | McCallister et al. |

(Continued)

FOREIGN PATENT DOCUMENTS

| | | |
|---|---|---|
| EP | 3174199 A2 | 5/2012 |
| JP | H03104422 A | 5/1991 |

(Continued)

OTHER PUBLICATIONS

Non-Final Office Action for U.S. Appl. No. 14/836,634, dated May 16, 2016, 9 pages.

(Continued)

*Primary Examiner* — Tanmay K Shah
(74) *Attorney, Agent, or Firm* — Withrow & Terranova, P.L.L.C.

(57) ABSTRACT

The present disclosure relates to an envelope tracking system that is configured to improve the performance of radio frequency power amplifier circuitry by compensating for errors that become more significant as modulation bandwidth increases. These errors include power amplifier collector-base capacitance, time delay between power amplifier stages, and interconnect distance between the baseband modulation source and the power amplifier collector.

22 Claims, 14 Drawing Sheets

(56) References Cited

U.S. PATENT DOCUMENTS

| | | |
|---|---|---|
| 7,994,862 B1 | 8/2011 | Pukhovski |
| 8,461,928 B2 | 6/2013 | Yahav et al. |
| 8,493,141 B2 | 7/2013 | Khlat et al. |
| 8,519,788 B2 | 8/2013 | Khlat |
| 8,588,713 B2 | 11/2013 | Khlat |
| 8,718,188 B2 | 5/2014 | Balteanu et al. |
| 8,723,492 B2 | 5/2014 | Korzeniowski |
| 8,725,218 B2 | 5/2014 | Brown et al. |
| 8,774,065 B2 | 7/2014 | Khlat et al. |
| 8,803,603 B2 | 8/2014 | Wimpenny |
| 8,854,129 B2 | 10/2014 | Wilson |
| 8,879,665 B2 | 11/2014 | Xia et al. |
| 8,913,690 B2 | 12/2014 | Onishi |
| 8,989,682 B2 | 3/2015 | Ripley et al. |
| 9,018,921 B2 | 4/2015 | Gurlahosur |
| 9,020,451 B2 | 4/2015 | Khlat |
| 9,041,364 B2 | 5/2015 | Khlat |
| 9,041,365 B2 | 5/2015 | Kay et al. |
| 9,055,529 B2 | 6/2015 | Shih |
| 9,065,509 B1 | 6/2015 | Yan et al. |
| 9,069,365 B2 | 6/2015 | Brown et al. |
| 9,098,099 B2 | 8/2015 | Park et al. |
| 9,166,538 B2 | 10/2015 | Hong et al. |
| 9,166,830 B2 | 10/2015 | Camuffo et al. |
| 9,167,514 B2 | 10/2015 | Dakshinamurthy et al. |
| 9,197,182 B2 | 11/2015 | Baxter et al. |
| 9,225,362 B2 | 12/2015 | Drogi et al. |
| 9,247,496 B2 | 1/2016 | Khlat |
| 9,263,997 B2 | 2/2016 | Vinayak |
| 9,270,230 B2 | 2/2016 | Henshaw et al. |
| 9,270,239 B2 | 2/2016 | Drogi et al. |
| 9,271,236 B2 | 2/2016 | Drogi |
| 9,280,163 B2 | 3/2016 | Kay et al. |
| 9,288,098 B2 | 3/2016 | Yan et al. |
| 9,298,198 B2 | 3/2016 | Kay et al. |
| 9,344,304 B1 | 5/2016 | Cohen |
| 9,356,512 B2 | 5/2016 | Chowdhury et al. |
| 9,377,797 B2 | 6/2016 | Kay et al. |
| 9,379,667 B2 | 6/2016 | Khlat et al. |
| 9,445,371 B2 | 9/2016 | Khesbak et al. |
| 9,515,622 B2 | 12/2016 | Nentwig et al. |
| 9,520,907 B2 | 12/2016 | Peng et al. |
| 9,584,071 B2 | 2/2017 | Khlat |
| 9,595,869 B2 | 3/2017 | Lerdworatawee |
| 9,595,981 B2 | 3/2017 | Khlat |
| 9,596,110 B2 | 3/2017 | Jiang et al. |
| 9,614,477 B1 | 4/2017 | Rozenblit et al. |
| 9,634,666 B2 | 4/2017 | Krug |
| 9,748,845 B1 | 8/2017 | Kotikalapoodi |
| 9,806,676 B2 | 10/2017 | Balteanu et al. |
| 9,831,834 B2 | 11/2017 | Balteanu et al. |
| 9,837,962 B2 | 12/2017 | Mathe et al. |
| 9,923,520 B1 | 3/2018 | Abdelfattah et al. |
| 10,003,416 B1 | 6/2018 | Lloyd |
| 10,090,808 B1 | 10/2018 | Henzler et al. |
| 10,097,145 B1 | 10/2018 | Khlat et al. |
| 10,103,693 B2 | 10/2018 | Zhu et al. |
| 10,110,169 B2 | 10/2018 | Khesbak et al. |
| 10,158,329 B1 | 12/2018 | Khlat |
| 10,158,330 B1 | 12/2018 | Khlat |
| 10,170,989 B2 | 1/2019 | Balteanu et al. |
| 10,291,181 B2 | 5/2019 | Kim et al. |
| 10,326,408 B2 | 6/2019 | Khlat et al. |
| 10,382,071 B2 | 8/2019 | Rozek et al. |
| 10,476,437 B2 | 11/2019 | Nag et al. |
| 10,862,431 B1 | 12/2020 | Khlat |
| 10,879,804 B2 | 12/2020 | Kim et al. |
| 11,050,433 B1 | 6/2021 | Melanson et al. |
| 11,121,684 B2 | 9/2021 | Henzler et al. |
| 11,128,261 B2 * | 9/2021 | Ranta .................... H03F 1/0261 |
| 2002/0167827 A1 | 11/2002 | Umeda et al. |
| 2003/0107428 A1 | 6/2003 | Khouri et al. |
| 2004/0266366 A1 | 12/2004 | Robinson et al. |
| 2005/0090209 A1 | 4/2005 | Behzad |
| 2005/0227646 A1 | 10/2005 | Yamazaki et al. |
| 2005/0232385 A1 | 10/2005 | Yoshikawa et al. |
| 2006/0028271 A1 | 2/2006 | Wilson |
| 2006/0240786 A1 | 10/2006 | Liu |
| 2007/0052474 A1 | 3/2007 | Saito |
| 2007/0258602 A1 | 11/2007 | Vepsalainen et al. |
| 2008/0116960 A1 | 5/2008 | Nakamura |
| 2009/0016085 A1 | 1/2009 | Rader et al. |
| 2009/0045872 A1 | 2/2009 | Kenington |
| 2009/0191826 A1 | 7/2009 | Takinami et al. |
| 2010/0283534 A1 | 11/2010 | Pierdomenico |
| 2010/0308919 A1 | 12/2010 | Adamski et al. |
| 2011/0074373 A1 | 3/2011 | Lin |
| 2011/0136452 A1 | 6/2011 | Pratt et al. |
| 2011/0175681 A1 | 7/2011 | Inamori et al. |
| 2011/0279179 A1 | 11/2011 | Vice |
| 2012/0194274 A1 | 8/2012 | Fowers et al. |
| 2012/0200435 A1 | 8/2012 | Ngo et al. |
| 2012/0299645 A1 | 11/2012 | Southcombe et al. |
| 2012/0299647 A1 | 11/2012 | Honjo et al. |
| 2013/0021827 A1 | 1/2013 | Ye |
| 2013/0100991 A1 | 4/2013 | Woo |
| 2013/0127548 A1 | 5/2013 | Popplewell et al. |
| 2013/0130724 A1 | 5/2013 | Kumar Reddy et al. |
| 2013/0162233 A1 | 6/2013 | Marty |
| 2013/0187711 A1 | 7/2013 | Goedken et al. |
| 2013/0200865 A1 | 8/2013 | Wimpenny |
| 2013/0271221 A1 | 10/2013 | Levesque et al. |
| 2014/0009226 A1 | 1/2014 | Severson |
| 2014/0028370 A1 | 1/2014 | Wimpenny |
| 2014/0028390 A1 | 1/2014 | Davis |
| 2014/0057684 A1 | 2/2014 | Khlat |
| 2014/0103995 A1 | 4/2014 | Langer |
| 2014/0155002 A1 | 6/2014 | Dakshinamurthy et al. |
| 2014/0184335 A1 | 7/2014 | Nobbe et al. |
| 2014/0199949 A1 | 7/2014 | Nagode et al. |
| 2014/0210550 A1 | 7/2014 | Mathe et al. |
| 2014/0218109 A1 | 8/2014 | Wimpenny |
| 2014/0235185 A1 | 8/2014 | Drogi |
| 2014/0266423 A1 | 9/2014 | Drogi et al. |
| 2014/0266428 A1 | 9/2014 | Chiron et al. |
| 2014/0315504 A1 | 10/2014 | Sakai et al. |
| 2014/0361830 A1 | 12/2014 | Mathe et al. |
| 2014/0361837 A1 | 12/2014 | Strange et al. |
| 2015/0048883 A1 | 2/2015 | Vinayak |
| 2015/0071382 A1 | 3/2015 | Wu et al. |
| 2015/0098523 A1 | 4/2015 | Lim et al. |
| 2015/0139358 A1 * | 5/2015 | Asuri .................... H04B 17/10 375/297 |
| 2015/0155836 A1 | 6/2015 | Midya et al. |
| 2015/0188432 A1 | 7/2015 | Vannorsdel et al. |
| 2015/0236652 A1 | 8/2015 | Yang et al. |
| 2015/0236654 A1 | 8/2015 | Jiang et al. |
| 2015/0236729 A1 | 8/2015 | Peng et al. |
| 2015/0280652 A1 | 10/2015 | Cohen |
| 2015/0333781 A1 * | 11/2015 | Alon .................... H03F 3/19 370/277 |
| 2016/0050629 A1 | 2/2016 | Khesbak et al. |
| 2016/0065137 A1 | 3/2016 | Khlat |
| 2016/0099686 A1 | 4/2016 | Perreault et al. |
| 2016/0099687 A1 | 4/2016 | Khlat |
| 2016/0105151 A1 | 4/2016 | Langer |
| 2016/0118941 A1 | 4/2016 | Wang |
| 2016/0126900 A1 | 5/2016 | Shute |
| 2016/0173031 A1 | 6/2016 | Langer |
| 2016/0181995 A1 | 6/2016 | Nentwig et al. |
| 2016/0187627 A1 | 6/2016 | Abe |
| 2016/0197627 A1 | 7/2016 | Qin et al. |
| 2016/0226448 A1 | 8/2016 | Wimpenny |
| 2016/0294587 A1 | 10/2016 | Jiang et al. |
| 2017/0012675 A1 * | 1/2017 | Frederick .................... H04L 27/06 |
| 2017/0141736 A1 | 5/2017 | Pratt et al. |
| 2017/0302183 A1 | 10/2017 | Young |
| 2017/0317913 A1 | 11/2017 | Kim et al. |
| 2017/0338773 A1 | 11/2017 | Balteanu et al. |
| 2018/0013465 A1 | 1/2018 | Chiron et al. |
| 2018/0048265 A1 | 2/2018 | Nentwig |
| 2018/0048276 A1 | 2/2018 | Khlat et al. |
| 2018/0076772 A1 | 3/2018 | Khesbak et al. |
| 2018/0123453 A1 | 5/2018 | Puggelli et al. |

(56) References Cited

U.S. PATENT DOCUMENTS

| | | |
|---|---|---|
| 2018/0152144 A1 | 5/2018 | Choo et al. |
| 2018/0288697 A1 | 10/2018 | Camuffo et al. |
| 2018/0302042 A1 | 10/2018 | Zhang et al. |
| 2018/0309414 A1 | 10/2018 | Khlat et al. |
| 2018/0367101 A1 | 12/2018 | Chen et al. |
| 2018/0375476 A1 | 12/2018 | Balteanu et al. |
| 2019/0028060 A1 | 1/2019 | Jo et al. |
| 2019/0044480 A1 | 2/2019 | Khlat |
| 2019/0068234 A1 | 2/2019 | Khlat et al. |
| 2019/0097277 A1 | 3/2019 | Fukae |
| 2019/0109566 A1 | 4/2019 | Folkmann et al. |
| 2019/0109613 A1 | 4/2019 | Khlat et al. |
| 2019/0222178 A1 | 7/2019 | Khlat et al. |
| 2019/0229623 A1 | 7/2019 | Tsuda et al. |
| 2019/0238095 A1 | 8/2019 | Khlat |
| 2019/0253023 A1 | 8/2019 | Yang et al. |
| 2019/0267956 A1 | 8/2019 | Granger-Jones et al. |
| 2019/0222175 A1 | 10/2019 | Khlat et al. |
| 2020/0007090 A1 | 1/2020 | Khlat et al. |
| 2020/0036337 A1 | 1/2020 | Khlat |
| 2020/0106392 A1 | 4/2020 | Khlat et al. |
| 2020/0136561 A1 | 4/2020 | Khlat et al. |
| 2020/0136563 A1 | 4/2020 | Khlat |
| 2020/0136575 A1 | 4/2020 | Khlat et al. |
| 2020/0144966 A1 | 5/2020 | Khlat |
| 2020/0153394 A1 | 5/2020 | Khlat et al. |
| 2020/0177131 A1 | 6/2020 | Khlat |
| 2020/0204116 A1 | 6/2020 | Khlat |
| 2020/0228063 A1 | 7/2020 | Khlat |
| 2020/0259456 A1 | 8/2020 | Khlat |
| 2020/0259685 A1 | 8/2020 | Khlat |
| 2020/0266766 A1 | 8/2020 | Khlat et al. |
| 2020/0321848 A1 | 10/2020 | Khlat |
| 2020/0328720 A1 | 10/2020 | Khlat |
| 2020/0336105 A1 | 10/2020 | Khlat |
| 2020/0336111 A1 | 10/2020 | Khlat |
| 2020/0350865 A1 | 11/2020 | Khlat |
| 2020/0382066 A1 | 12/2020 | Khlat |
| 2021/0036604 A1 | 2/2021 | Khlat et al. |
| 2021/0159590 A1 | 5/2021 | Na et al. |
| 2021/0184708 A1 | 6/2021 | Khlat |
| 2021/0194515 A1 | 6/2021 | Go et al. |

FOREIGN PATENT DOCUMENTS

| | | |
|---|---|---|
| WO | 2018182778 A1 | 10/2018 |
| WO | 2020206246 A1 | 10/2020 |
| WO | 2021046453 A1 | 3/2021 |

OTHER PUBLICATIONS

Non-Final Office Action for U.S. Appl. No. 14/868,890, dated Jul. 14, 2016, 13 pages.
Non-Final Office Action for U.S. Appl. No. 15/792,909, dated May 18, 2018, 13 pages.
Notice of Allowance for U.S. Appl. No. 15/459,449, dated Mar. 28, 2018, 7 pages.
Notice of Allowance for U.S. Appl. No. 15/723,460, dated Jul. 24, 2018, 8 pages.
Notice of Allowance for U.S. Appl. No. 15/704,131, dated Jul. 17, 2018, 7 pages.
Notice of Allowance for U.S. Appl. No. 15/728,202, dated Aug. 2, 2018, 7 pages.
Non-Final Office Action for U.S. Appl. No. 15/888,300, dated Aug. 28, 2018, 11 pages.
Notice of Allowance for U.S. Appl. No. 15/792,909, dated Dec. 19, 2018, 11 pages.
Notice of Allowance for U.S. Appl. No. 15/993,705, dated Oct. 31, 2018, 7 pages.
Pfister, Henry, "Discrete-Time Signal Processing," Lecture Note, pfister.ee.duke.edu/courses/ece485/dtsp.pdf, Mar. 3, 2017, 22 pages.
Non-Final Office Action for U.S. Appl. No. 15/888,260, dated May 2, 2019, 14 pages.
Non-Final Office Action for U.S. Appl. No. 15/986,948, dated Mar. 28, 2019, 8 pages.
Non-Final Office Action for U.S. Appl. No. 16/018,426, dated Apr. 11, 2019, 11 pages.
Supplemental Notice of Allowability for U.S. Appl. No. 15/902,244, dated Mar. 20, 2019, 6 pages.
Notice of Allowance for U.S. Appl. No. 15/902,244, dated Feb. 8, 2019, 8 pages.
Advisory Action for U.S. Appl. No. 15/888,300, dated Jun. 5, 2019, 3 pages.
Notice of Allowance for U.S. Appl. No. 15/984,566, dated May 21, 2019, 6 pages.
Notice of Allowance for U.S. Appl. No. 16/150,556, dated Jul. 29, 2019, 7 pages.
Non-Final Office Action for U.S. Appl. No. 15/888,300, dated Jun. 27, 2019, 17 pages.
Final Office Action for U.S. Appl. No. 15/986,948, dated Aug. 27, 2019, 9 pages.
Advisory Action for U.S. Appl. No. 15/986,948, dated Nov. 8, 2019, 3 pages.
Notice of Allowance for U.S. Appl. No. 15/986,948, dated Dec. 13, 2019, 7 pages.
Final Office Action for U.S. Appl. No. 16/018,426, dated Sep. 4, 2019, 12 pages.
Advisory Action for U.S. Appl. No. 16/018,426, dated Nov. 19, 2019, 3 pages.
Notice of Allowance for U.S. Appl. No. 16/180,887, dated Jan. 13, 2020, 8 pages.
Notice of Allowance for U.S. Appl. No. 15/888,300, dated Jan. 14, 2020, 11 pages.
Non-Final Office Action for U.S. Appl. No. 16/122,611, dated Mar. 11, 2020, 16 pages.
Corrected Notice of Allowability for U.S. Appl. No. 15/888,300, dated Feb. 25, 2020, 7 pages.
Notice of Allowance for U.S. Appl. No. 16/018,426, dated Mar. 31, 2020, 7 pages.
Non-Final Office Action for U.S. Appl. No. 16/174,535, dated Feb. 4, 2020, 7 pages.
Quayle Action for U.S. Appl. No. 16/354,234, dated Mar. 6, 2020, 8 pages.
Notice of Allowance for U.S. Appl. No. 16/354,234, dated Apr. 24, 2020, 9 pages.
Non-Final Office Action for U.S. Appl. No. 16/246,859, dated Apr. 28, 2020, 9 pages.
Corrected Notice of Allowability for U.S. Appl. No. 15/888,300, dated May 13, 2020, 7 pages.
Notice of Allowance for U.S. Appl. No. 16/155,127, dated Jun. 1, 2020, 8 pages.
Final Office Action for U.S. Appl. No. 16/174,535, dated Jul. 1, 2020, 7 pages.
Non-Final Office Action for U.S. Appl. No. 16/284,023, dated Jun. 24, 2020, 7 pages.
Non-Final Office Action for U.S. Appl. No. 16/435,940, dated Jul. 23, 2020, 6 pages.
Final Office Action for U.S. Appl. No. 15/888,300, dated Feb. 15, 2019, 15 pages.
Final Office Action for U.S. Appl. No. 16/122,611, dated Sep. 18, 2020, 17 pages.
Advisory Action for U.S. Appl. No. 16/174,535, dated Sep. 24, 2020, 3 pages.
Notice of Allowance for U.S. Appl. No. 16/174,535, dated Oct. 29, 2020, 7 pages.
Notice of Allowance for U.S. Appl. No. 16/246,859, dated Sep. 18, 2020, 8 pages.
Final Office Action for U.S. Appl. No. 16/284,023, dated Nov. 3, 2020, 7 pages.
Quayle Action for U.S. Appl. No. 16/421,905, dated Aug. 25, 2020, 5 pages.
Non-Final Office Action for U.S. Appl. No. 16/416,812, dated Oct. 16, 2020, 8 pages.
Non-Final Office Action for U.S. Appl. No. 16/514,051, dated Nov. 13, 2020, 9 pages.

(56) References Cited

OTHER PUBLICATIONS

Non-Final Office Action for U.S. Appl. No. 16/774,060, dated Aug. 17, 2020, 6 pages.
Notice of Allowance for U.S. Appl. No. 16/122,611, dated Dec. 1, 2020, 9 pages.
Notice of Allowance for U.S. Appl. No. 16/122,611, dated Apr. 1, 2021, 8 pages.
Notice of Allowance for U.S. Appl. No. 16/689,236 dated Jun. 9, 2021, 7 pages.
Non-Final Office Action for U.S. Appl. No. 16/775,554, dated Jun. 14, 2021, 5 pages.
Non-Final Office Action for U.S. Appl. No. 16/582,471, dated Mar. 24, 2021, 11 pages.
Non-Final Office Action for U.S. Appl. No. 16/597,952, dated May 26, 2021, 7 pages.
Quayle Action for U.S. Appl. No. 16/589,940, dated Dec. 4, 2020, 8 pages.
Notice of Allowance for U.S. Appl. No. 16/122,611, dated Jan. 13, 2021, 8 pages.
Notice of Allowance for U.S. Appl. No. 16/284,023, dated Jan. 19, 2021, 7 pages.
Notice of Allowance for U.S. Appl. No. 16/416,812, dated Feb. 16, 2021, 8 pages.
Non-Final Office Action for U.S. Appl. No. 16/689,236 dated Mar. 2, 2021, 15 pages.
Notice of Allowance for U.S. Appl. No. 16/435,940, dated Dec. 21, 2020, 7 pages.
Notice of Allowance for U.S. Appl. No. 16/774,060, dated Feb. 3, 2021, 7 pages.
Notice of Allowance for U.S. Appl. No. 16/590,790, dated Jan. 27, 2021, 7 pages.
Notice of Allowance for U.S. Appl. No. 16/661,061, dated Feb. 10, 2021, 7 pages.
Wan, F. et al., "Negative Group Delay Theory of a Four-Port RC-Network Feedback Operational Amplifier," IEEE Access, vol. 7, Jun. 13, 2019, IEEE, 13 pages.
Notice of Allowance for U.S. Appl. No. 16/582,471, dated Jun. 22, 2021, 9 pages.
Notice of Allowance for U.S. Appl. No. 16/834,049, dated Jun. 24, 2021, 8 pages.
Notice of Allowance for U.S. Appl. No. 17/011,313, dated Nov. 4, 2021, 8 pages.
Non-Final Office Action for U.S. Appl. No. 16/597,952, dated Nov. 10, 2021, 9 pages.
Quayle Action for U.S. Appl. No. 16/855,154, dated Oct. 25, 2021, 6 pages.
Notice of Allowance for U.S. Appl. No. 17/115,982, dated Nov. 12, 2021, 8 pages.
Non-Final Office Action for U.S. Appl. No. 17/073,764, dated Dec. 24, 2021, 22 pages.
Notice of Allowance for U.S. Appl. No. 16/582,471, dated Feb. 1, 2022, 9 pages.
Non-Final Office Action for U.S. Appl. No. 16/807,575, dated Jan. 31, 2022, 12 pages.
International Search Report and Written Opinion for International Patent Application No. PCT/US2021/050892, dated Jan. 5, 2022, 20 pages.
International Search Report and Written Opinion for International Patent Application No. PCT/US2021/052151, dated Jan. 4, 2022, 16 pages.
International Search Report and Written Opinion for International Patent Application No. PCT/US2021/054141 dated Jan. 25, 2022, 15 pages.
Non-Final Office Action for U.S. Appl. No. 17/032,553, dated Mar. 21, 2022, 4 pages.
International Search Report and Written Opinion for International Patent Application No. PCT/US2021/052830, dated Jan. 24, 2022, 13 pages.

\* cited by examiner

ENVELOPE TRACKING SYSTEM

RELATED APPLICATIONS

This application claims the benefit of provisional patent application Ser. No. 62/951,021, filed Dec. 20, 2019, the disclosure of which is hereby incorporated herein by reference in its entirety.

This application is related to U.S. patent application Ser. No. 17/126,552, filed Dec. 18, 2020, titled POWER AMPLIFIER CIRCUITRY, the disclosure of which is hereby incorporated herein by reference in its entirety.

FIELD OF THE DISCLOSURE

Embodiments of the present disclosure relate to radio frequency power amplifier circuitry supplied by envelope/average power tracking circuitry used in radio frequency communications systems.

BACKGROUND

Mobile communication devices, such as smartphones, have become increasingly common in current society for providing wireless communication services. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience has also led to the rise of so-called wearable devices, such as smartwatches. Over time, these wearable devices have evolved from simple companion devices to mobile communication devices into full-fledged multi-functional wireless communication devices. Nowadays, most wearable electronic devices are often equipped with digital and analog circuitries capable of communicating radio frequency (RF) signals in a variety of wireless communication systems, such as long-term evolution (LTE), Wi-Fi, Bluetooth, and so on. Like mobile communication devices, wearable devices often employ sophisticated power amplifiers to amplify RF signals to help improve coverage range, data throughput, and reliability of the wearable devices.

Envelope tracking (ET) is a power management technology designed to improve efficiency levels of power amplifiers. In this regard, it may be desirable to employ ET across a variety of wireless communication technologies to help reduce power consumption and thermal dissipation in wearable devices. Notably, the RF signal(s) communicated in different wireless communication systems may correspond to different modulation bandwidths (e.g., between 80 kHz and 320 MHz). As such, it may be further desirable to ensure that the power amplifiers can maintain optimal efficiency and linearity across a wide range of modulation bandwidth.

SUMMARY

The present disclosure relates to an envelope tracking system configured to improve the performance of radio frequency power amplifier circuitry by compensating for errors that become more significant as modulation bandwidth increases. These errors include power amplifier collector-base capacitance, time delay between power amplifier stages, and interconnect distance between the baseband modulation source and the power amplifier collector.

Moreover, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

DETAILED DESCRIPTION

Figure 1:
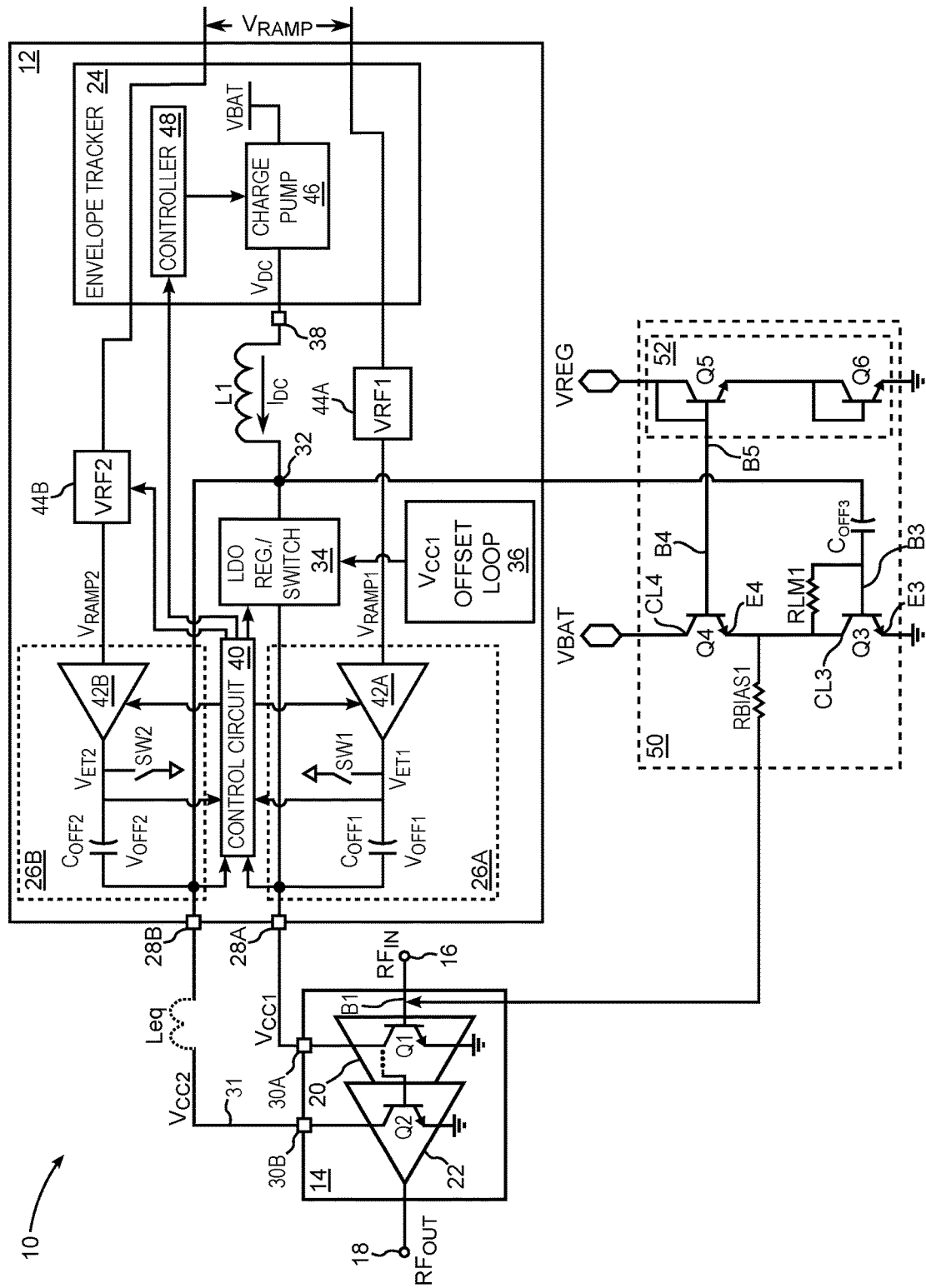
FIG. 1 is a schematic of an embodiment of an architecture for very wide modulation transmitter envelope tracking.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

The present disclosure relates to circuitry and methods to improve the performance of an envelope tracking (ET) system by compensating for errors that become increasingly problematic as modulation bandwidth increases. These errors include power amplifier collector-base capacitance, time delay between multiple power amplifier stages, and interconnect distance such as conductor length between a baseband modulation source and a power amplifier collector.

FIG. 1 is a schematic of an exemplary embodiment of an envelope tracking system 10 having envelope tracking circuitry 12 that in accordance with the present disclosure supplies modulated power to a radio frequency (RF) power amplifier 14. The envelope tracking system 10 may include the RF power amplifier 14 or be coupled to the RF power amplifier 14, which is configured to amplify an RF signal received at an RF input terminal 16 and output the amplified RF signal at an RF output terminal 18. The RF power amplifier 14 may include a driver stage 20 having a driver transistor Q1 and an output stage 22 having a power transistor Q2. The envelope tracking circuitry 12 may also include an envelope tracker 24 that is configured to generate a low-frequency current IDC and a low-frequency supply voltage $V_{DC}$. The envelope tracking circuitry 12 includes a first tracking circuit 26A configured to generate a first supply voltage $V_{CC1}$ and a second tracking circuit 26B configured to generate a second supply voltage $V_{CC2}$. The envelope tracking circuitry 12 also includes a first tracking voltage terminal 28A coupled to a driver supply terminal 30A and a second tracking voltage terminal 28B coupled to an output stage supply terminal 30B through an interconnect 31 that has an equivalent inductance Leq. The first tracking voltage terminal 28A is coupled to a supply node 32 through a multifunction circuit 34 that may include a low dropout (LDO) regulator and switch (not shown). An offset voltage loop 36 may drive the LDO regulator with an offset voltage. The second tracking voltage terminal 28B is also coupled to the supply node 32, and in this exemplary case is directly coupled to the supply node 32. A power inductor L1 is coupled between an inductor output terminal 38 of the envelope tracker 24. A node that includes the inductor output terminal 38 is referred as an LX node.

The envelope tracking circuitry 12 further includes a control circuit 40, which can be any type of microcontroller or a field-programmable gate array (FPGA), for example. The functionality of the control circuit 40 may be shared between various control circuits and/or controllers without affecting functionality and operation of the envelope tracking system 10.

The control circuit 40 is coupled to the first tracking circuit 26A, the second tracking circuit 26B, and the multifunction circuit 34. The control circuit 40 is configured to individually or collectively control the first tracking circuit 26A, the second tracking circuit 26B to cause the first supply voltage $V_{CC1}$ and the second supply voltage $V_{CC2}$ to be output at the first tracking voltage terminal 28A and the second tracking voltage terminal 28B, respectively. The control circuit 40 is further configured to control the multifunction circuit 34 to supply the low-frequency current IDC and the low-frequency voltage $V_{DC}$ to the output stage 22 and/or the driver stage 20.

The first tracking circuit 26A includes a first tracking amplifier 42A that is configured to generate a first envelope tracking voltage $V_{ET1}$ in response to a first target modulation voltage $V_{RAMP1}$. In this regard, the first envelope tracking voltage $V_{ET1}$ can correspond to a time-variant voltage envelope that tracks (e.g., rises and falls with) the first target modulation voltage $V_{RAMP1}$.

The first tracking circuit 26A also includes a first offset capacitor $C_{OFF1}$ that is coupled between an output of the first tracking circuit 26A and the supply node 32. The first offset capacitor $C_{OFF1}$ is configured to raise the first envelope tracking voltage $V_{ET1}$ by a first offset voltage $V_{OFF1}$ to generate the first supply voltage $V_{CC1}$. The first tracking circuit 26A further includes a first switch SW1 coupled between the output of the first tracking amplifier 42A and a fixed voltage node such as ground. The control circuit 40 may control closing of the first switch SW1 to ground a plate of the first offset capacitor $C_{OFF1}$.

The second tracking circuit 26B includes a second tracking amplifier 42B that is configured to generate a second envelope tracking voltage $V_{ET2}$ in response to a second target modulation voltage $V_{RAMP2}$. In this regard, the second envelope tracking voltage $V_{ET2}$ can correspond to a time-variant voltage envelope that tracks (e.g., rises and falls with) the second target modulation voltage $V_{RAMP2}$.

The second tracking circuit 26B also includes a second offset capacitor $C_{OFF2}$ that is coupled between an output of the second tracking circuit 26B and the supply node 32. The second offset capacitor $C_{OFF2}$ is configured to raise the second envelope tracking voltage $V_{ET2}$ by a second offset voltage $V_{OFF2}$ to generate the second supply voltage $V_{CC2}$. The second tracking circuit 26B further includes a second switch SW2 coupled between the output of the second tracking amplifier 42B and a fixed voltage node such as ground. The control circuit 40 may control closing of the second switch SW2 to ground a plate of the second offset capacitor $C_{OFF2}$.

The envelope tracking circuitry 12 further includes a first voltage equalizer circuit 44A (denoted VRF1) and a second voltage equalizer circuit 44B (denoted as VRF2). The first voltage equalizer circuit 44A is configured to generate the first target modulation voltage $V_{RAMP1}$ based on a common modulation target voltage $V_{RAMP}$. The second voltage equalizer circuit 44B is configured to generate the second target modulation voltage $V_{RAMP2}$ based on the common target modulation voltage $V_{RAMP}$. The common target modulation voltage $V_{RAMP}$ has a time-variant voltage envelope that tracks (i.e., rises and fall with) a time-variant modulation envelope of an RF signal applied to the RF input terminal 16.

In a non-limiting example, the envelope tracker 24 includes a multi-level charge pump 46 configured to generate the low-frequency voltage $V_{DC}$ at multiple levels based on a battery voltage $V_{BAT}$ (e.g., 0×$V_{BAT}$, 1×$V_{BAT}$, or 2×$V_{BAT}$). An output of the multi-level charge pump 46 is coupled to the inductor output terminal 38. The envelope tracker 24 further includes a controller 48 that is configured to control switching of the charge pump 46. The controller 48 may be made of logic gates such as combinational and sequential logic gates or may be a microprocessor or a microcontroller. The controller 48 receives feedback from the control circuit 40 that is used by the controller to maintain the low-frequency voltage $V_{DC}$ within a predetermined range of a desired setpoint voltage or current.

The envelope tracking circuitry 10 further includes bias correction sub-circuitry 50 that biases and compensates for bias shifts in heterojunction bipolar transistor (HBT) power amplifiers such as RF power amplifier 14 caused by collector voltage modulation. Generally, one of the first supply voltage $V_{CC1}$ or the second supply voltage $V_{CC2}$ is directly or indirectly coupled through an offset capacitor $C_{OFF3}$ to a base B1 of the driver transistor Q1, which must be direct current (DC) biased. The exemplary embodiment of the power amplifier circuitry 20 depicted in FIG. 1 has the first base B1 indirectly coupled to the supply node 32 by way a third transistor Q3. In this case, a collector CL3 of the third transistor Q3 is DC coupled to the base B1 of the first transistor Q1 through a bias resistor RBIAS1. A base B3 of the third transistor Q3 is coupled to the supply node 32 through the third offset capacitor $C_{OFF3}$. An emitter E3 of the third transistor Q3 is coupled to a fixed voltage node, which in this exemplary embodiment is ground.

The third transistor Q3 and the third offset capacitor $C_{OFF3}$ comprise the bias correction sub-circuitry 50, which in this exemplary case further includes a fourth transistor Q4 that is coupled to the third transistor Q3 in an emitter-follower configuration. The fourth transistor Q4 has a collector CL4 that is coupled to a fixed DC voltage such as the battery voltage $V_{BAT}$. The fourth transistor Q4 also has an emitter E4 that is coupled to the collector CL3 of the third transistor Q3.

Moreover, in this exemplary embodiment, the bias correction sub-circuitry 50 further includes a diode stack 52 having two diode-connected transistors Q5 and Q6 coupled between a regulated voltage VREG and ground. A base B5 of the diode-connected transistor Q5 is coupled to the base B4 of the fourth transistor Q4. The diode stack 50 generates the reference voltage for the emitter-follower configuration.

In operation, the compensation current adds or subtracts directly from a base current of the driver transistor Q1. To prevent the compensation current from being absorbed by diode load impedance, the third base B3 and the third collector CL3 may be separated by a limit resistor RLM1 having a resistance value on the order of 1000Ω. However, a substantially larger resistance may generate noise and is not recommended. In some embodiments, the limit resistor RLM1 has a resistance between 500Ω to 2000Ω. In other embodiments, the limit resistor RLM1 has a resistance between 500Ω to 1000Ω. In yet other embodiments, the limit resistor has a resistance between 1000Ω to 2000Ω. Additional circuit structures employing either a diode or a separate transistor in parallel with the emitter-follower are also within the scope of the present disclosure for preventing the compensation current from being absorbed by diode load impedance.

The disclosure provides for, but is not limited to, the following:
1. Variable timing between the modulated power supply voltages $V_{CC1}$ and $V_{CC2}$, or by extension to any number of power amplifier stages used, while employing an envelope tracker and a single power inductor and being driven by a common target modulation voltage $V_{RAMP}$.
2. Compensation for bias errors due to error currents related to power amplifier collector-base capacitance of the RF power amplifier 14, referred to as bias slope compensation under envelope tracking operation using the bias correction sub-circuitry 50.
3. Compensation for error voltages at the power amplifier collector related to the inductance resulting from distance between the second racking voltage terminal 28B of the envelope tracking circuitry 12 and collector of the power transistor Q2 by employing at least one of the $V_{RAMP}$ filter (VRF) equalizers 44A and 44B.

Figure 2:
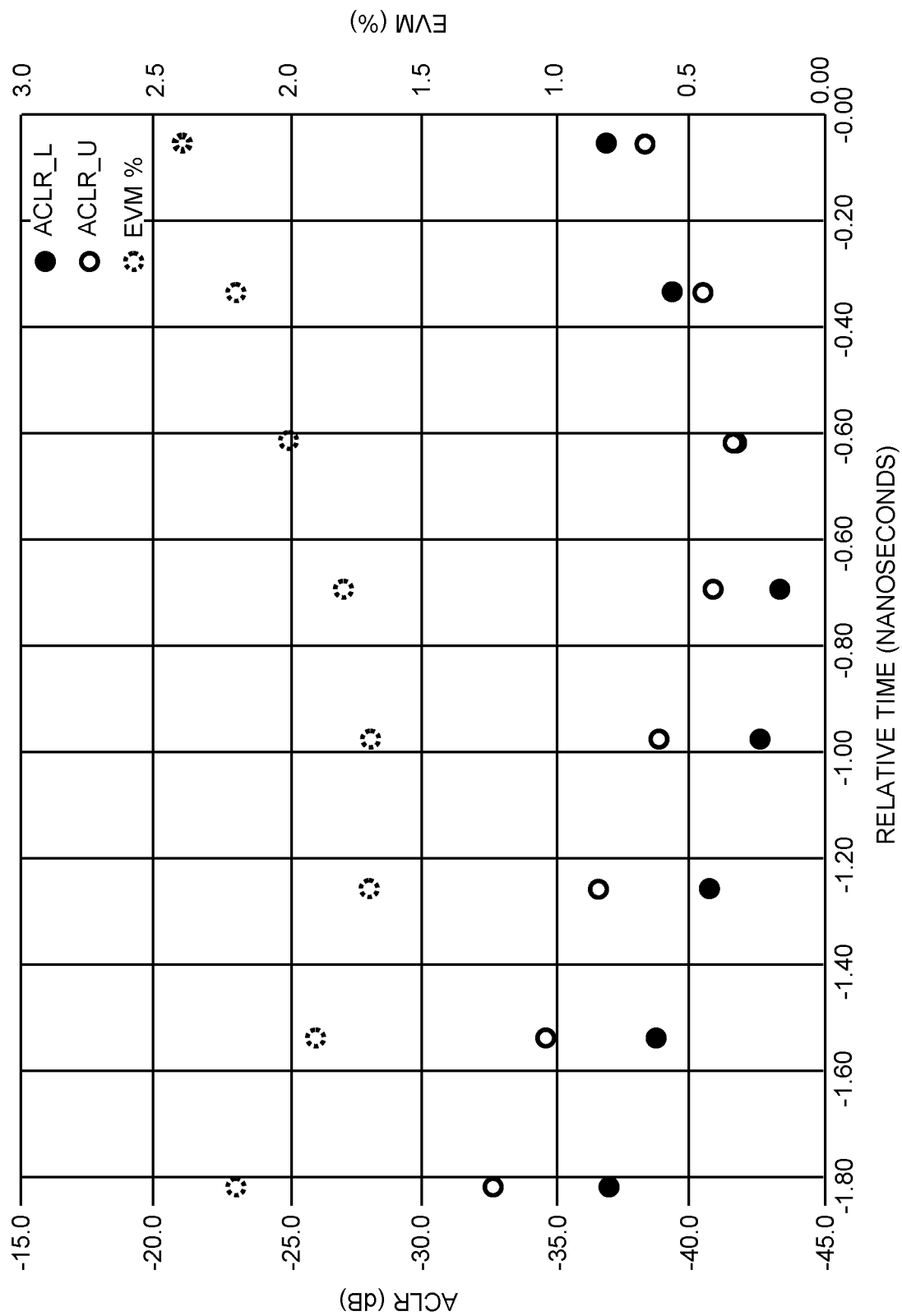
FIG. 2 is a plot showing optimizing envelope time delay for both driver and final stages for an envelope tracking system at 200 MHz.

A time delay exists between amplification stages, and however small, at some modulation bandwidth this time delay affects time alignment between the radio frequency waveform and the baseband collector modulation. FIG. 2 is a graph containing plots of error vector magnitude (EVM) depicted in dashed dots, adjacent channel leakage ratio (ACLR) upper variation depicted in hollow dots, and ACLR lower variation depicted in solid dots as power supply voltage $V_{CC1}$ modulation time delay is swept relative to the power supply voltage $V_{CC2}$ modulation time delay using a 200 MHz signal. Notice that ACLR is around −37 dBc at a relative time delay of 0 ns with EVM around 2.4%. Note that this is sample-by-sample root mean square error, not a true EVM calculation. The best ACLR is around −0.6 ns (−42 dBc, EVM ~2%), and the best EVM is around −1.2 ns (around −37 dBc ACLR, 1.7% EVM).

Figure 3:
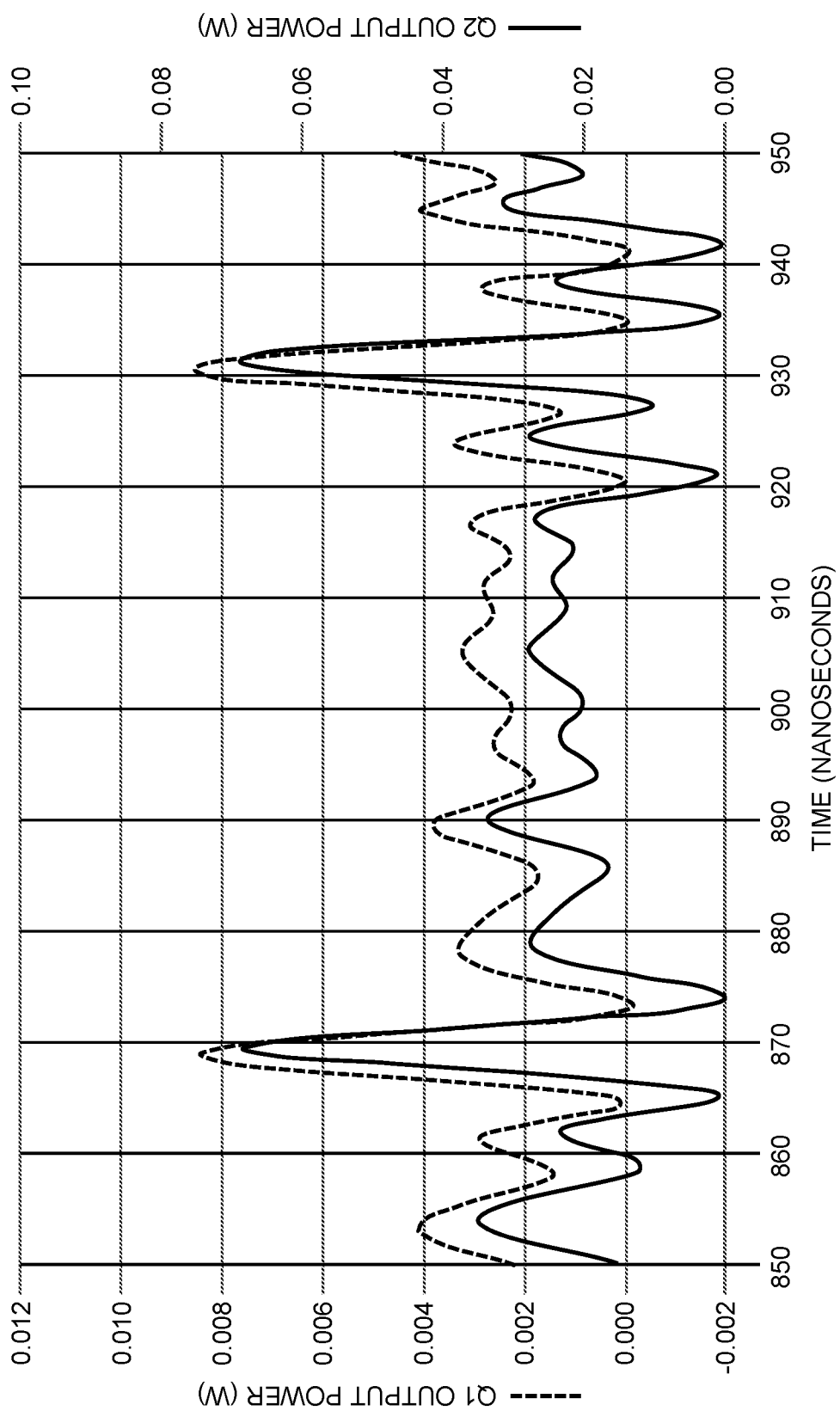
FIG. 3 is a graph showing the driver transistor Q1 and the output stage Q2 time domain power relative delays.

Notice that the $V_{CC1}$ time delay must precede the $V_{CC2}$ envelope whether optimizing EVM or ACLR, and the ACLR peak roughly corresponds to the time delay between the output power of the driver transistor Q1 and the output power of the output stage transistor Q2, as shown in FIG. 3. With $V_{CC1}$ and $V_{CC2}$ tied to the same node, this can be accomplished by supplying $V_{CC1}$ and using a passive network to delay $V_{CC2}$ relative to $V_{CC1}$. This results in more common mode inductance and a higher DC voltage drop to the highest current stage in the design, degrading performance and efficiency. Assuming the time delay between the driver and final stages remains somewhat fixed, as modulation bandwidth increases, it may be more important to adjust the driver voltage envelope relative to the final stage envelope.

Figure 4:
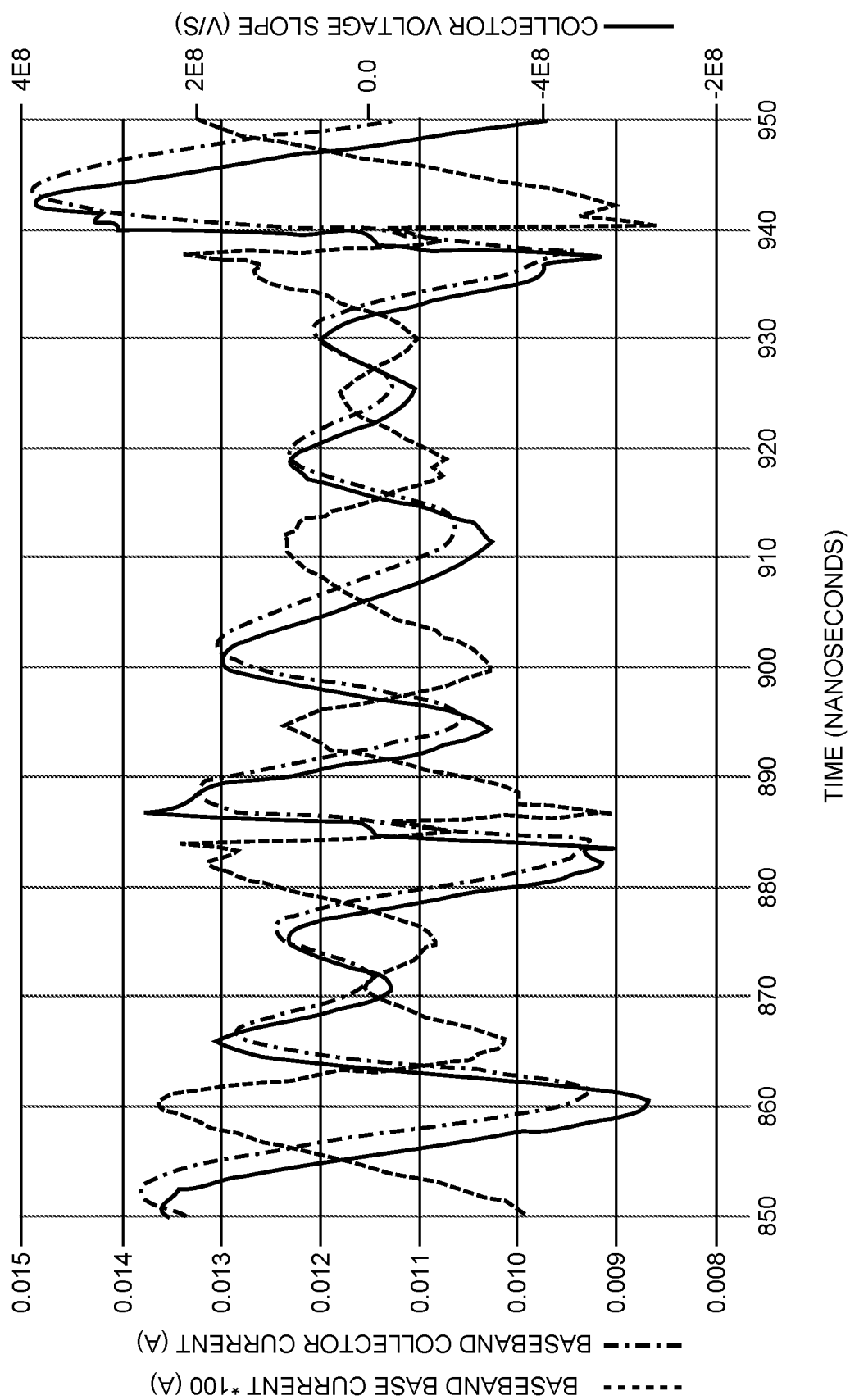
FIG. 4 is a related-art graph showing base-collector capacitance-related bias shifts due to envelope voltage slope.
Figure 5:
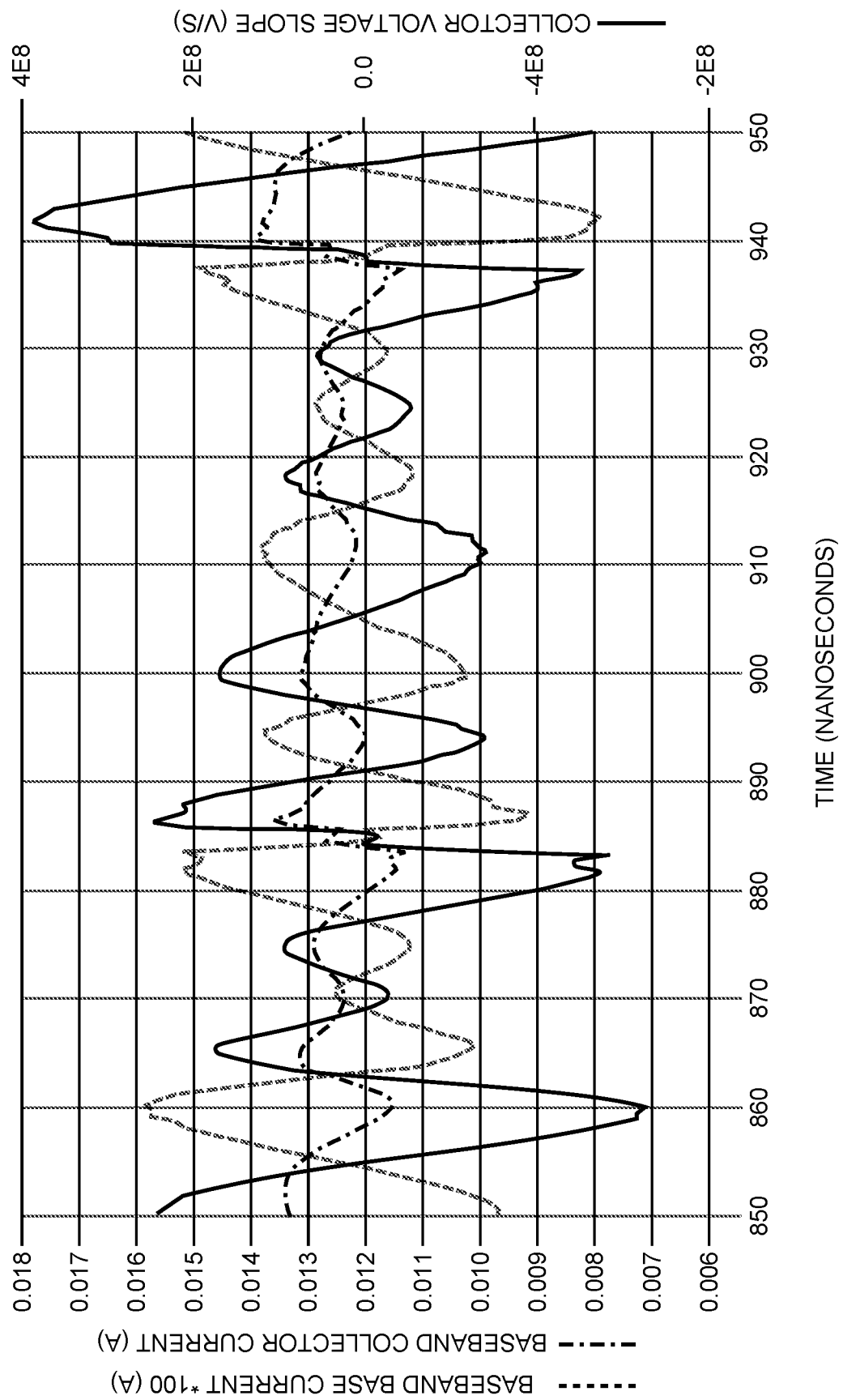
FIG. 5 is a graph showing compensating base-collector capacitance-related bias shifts due to envelope voltage slope.

Power stage bias point shifts are created by rapid changes in the envelope voltage, inducing transistor base currents through parasitic base-collector capacitance. The bias point perturbations to be compensated are shown in FIGS. 4 and 5, before and after compensation, respectively. A dashed line depicts bias point variation vs. time, and a solid line depicts the derivative of the envelope voltage vs. time. No compensation is present in the related-art plot of FIG. 4, but a substantial improvement according to the present disclosure is present in the plot of FIG. 5.

Current flow over distance to a first order can be modeled by a series inductance Thus, a model for separation due to the interconnect 31 between the envelope tracking circuitry 12 and the collector of the power transistor Q2 may be modeled as the equivalent inductance Leq. When extracting a lookup table from the RF power amplifier 14, a 1:1 correspondence between power amplifier current and power amplifier voltage can be extracted, and thus any modulation can be passed through this lookup table to calculate instantaneous power amplifier current. From this, that di/dt can be calculated that is required to calculate voltage across an inductor.

Figure 6:
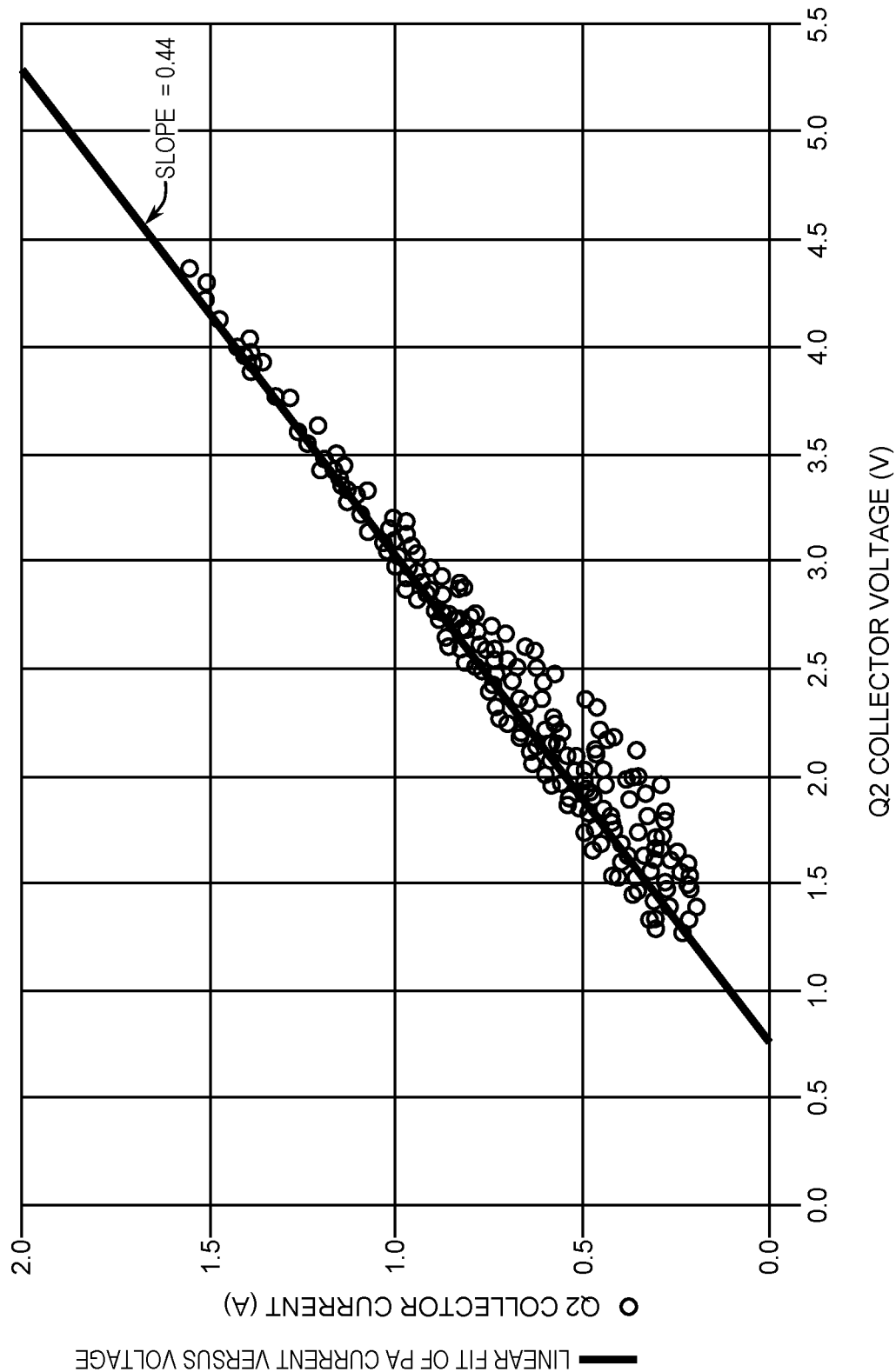
FIG. 6 is a plot showing power amplifier current vs. voltage across a lookup table.

FIG. 6 shows instantaneous power amplifier current mapped against instantaneous voltage, and for the purposes of cancelling instantaneous parasitic inductance voltage drops. A relationship may be simplified as a straight line. In the exemplary case depicted in FIG. 6, the slope of the straight line is 0.44.

One may then calculate instantaneous voltage drop across an arbitrary interconnect inductance as follows, where $V_L$ is the voltage across the parasitic evaluation board inductance:

$$v_{pa\_module} = v_{etic} - v_L$$

$$v_L = L_{eq} \frac{di_L}{dt}$$

$$i_L \sim 0.44 v_{etic} - 0.33$$

$$\frac{di_L}{dt} = \frac{di_L}{dv_{pa}} \frac{dv_{pa}}{dt} = 0.44 \frac{dv_{pa}}{dt}$$

In short, the voltage across the inductance can be directly offset by adding Leq*k*(the derivative of the ideal voltage to be supplied to the power amplifier). To implement this in a practical system, the multiplication factor Leq*k has to cover the possible ranges of k for various power amplifier power targets (this value represents the linear relationship between supply voltage and current) and for various interconnect inductance ranges that include a minimum distance and a maximum distance between the collector of the power transistor Q2 and envelope tracking circuitry.

An additional factor that can be compensated is the interconnect resistance. Accounting for expected variations is required. This approach is somewhat more direct since parasitic voltage drop is simply v=IR, and there is already a correspondence between power amplifier current and modulator voltage. In this case the power amplifier equivalent resistance can be estimated as follows, along with the resulting voltage drop estimate. Note that the minimum voltage Vmin is identified as the voltage where the line intercepts zero current, and the maximum current Imax equals a current magnitude at the maximum voltage Vmax, and the equivalent resistance of the power amplifier for calculation.

$$v_{pa\_module} = v_{etic} - v_R$$

$$v_R = R_{evb} i$$

$$R_{eq} \sim \frac{V_{max} - V_{min}}{I_{max}} = \frac{1}{0.44}$$

$$v_R \sim R_{evb} \cdot \frac{(V_{actual} - V_{min})}{0.44}$$

Figure 7:
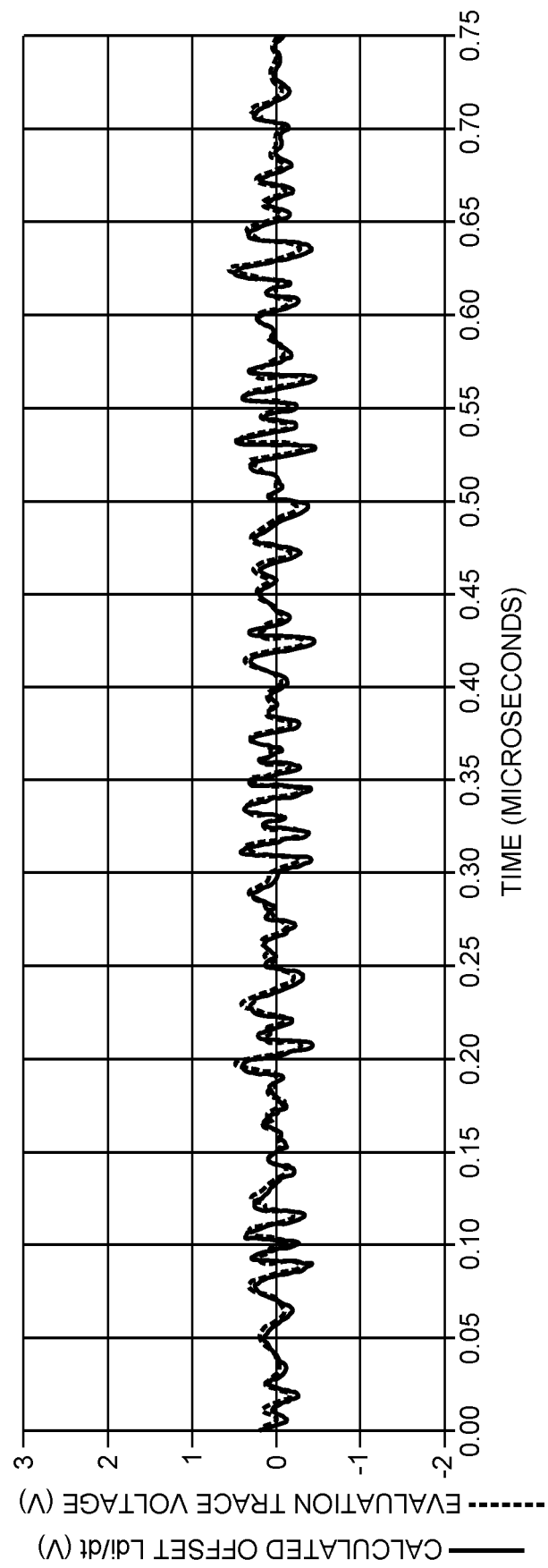
FIG. 7 is a graph showing the simulated relationship between a related-art evaluation board inductance and calculated offset.

The compensation design needs to account for the range of power amplifier resistances and application circuit layout resistances expected. FIG. 7 shows a simulation of actual voltage drops across an interconnecting inductor in a simulated circuit and the calculated voltage necessary to be applied as compensation, with substantial agreement.

Figure 8A:
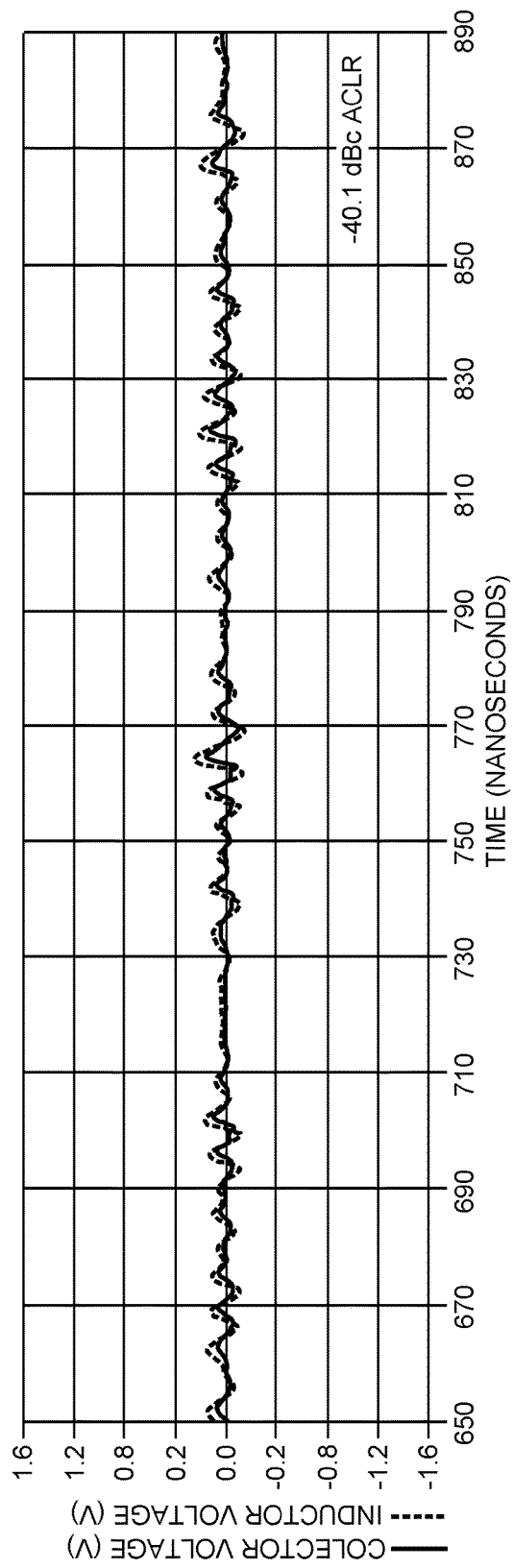
FIG. 8A is a graph of collector and inductor voltages versus time showing compensation errors with optimizing for time delay.
Figure 8B:
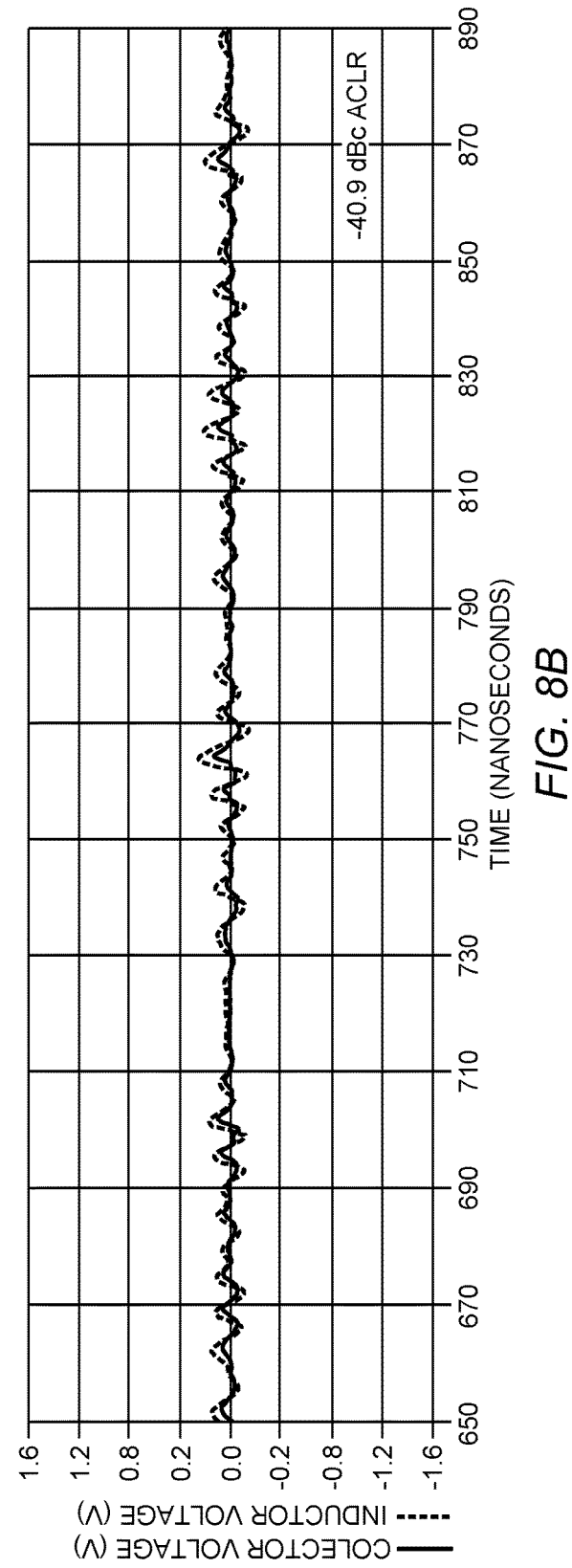
FIG. 8B is a graph of collector and inductor voltages versus time showing compensation errors without optimizing for time delay.

The error at the power amplifier module can be decreased slightly by compensating for time delay through the interconnect inductance as well. With 0.6 nH between the modulator and the power amplifier module, the results are shown in FIGS. 8A and 8B for 200 MHz bandwidth. This complication may not be necessary at 200 MHz but may be required for reasonable interconnect inductances as modulation bandwidth increases.

Note that this method ignores the interaction between the source impedance of the envelope tracking circuitry 12 and bias network impedances for the power amplifier 14. The first voltage equalizer circuit 44A (VRF1) and the second voltage equalizer circuit 4B (VRF2) each include programmable analog and/or analog/digital equalization that is ideally suited for dynamic frequency-sensitive interactions, such as output impedance changes with different configurations, whereas the method according to the present disclosure is better suited to fixed elements that do not change for a given system, namely, the distance between components on a given application circuit board.

Figure 9A:
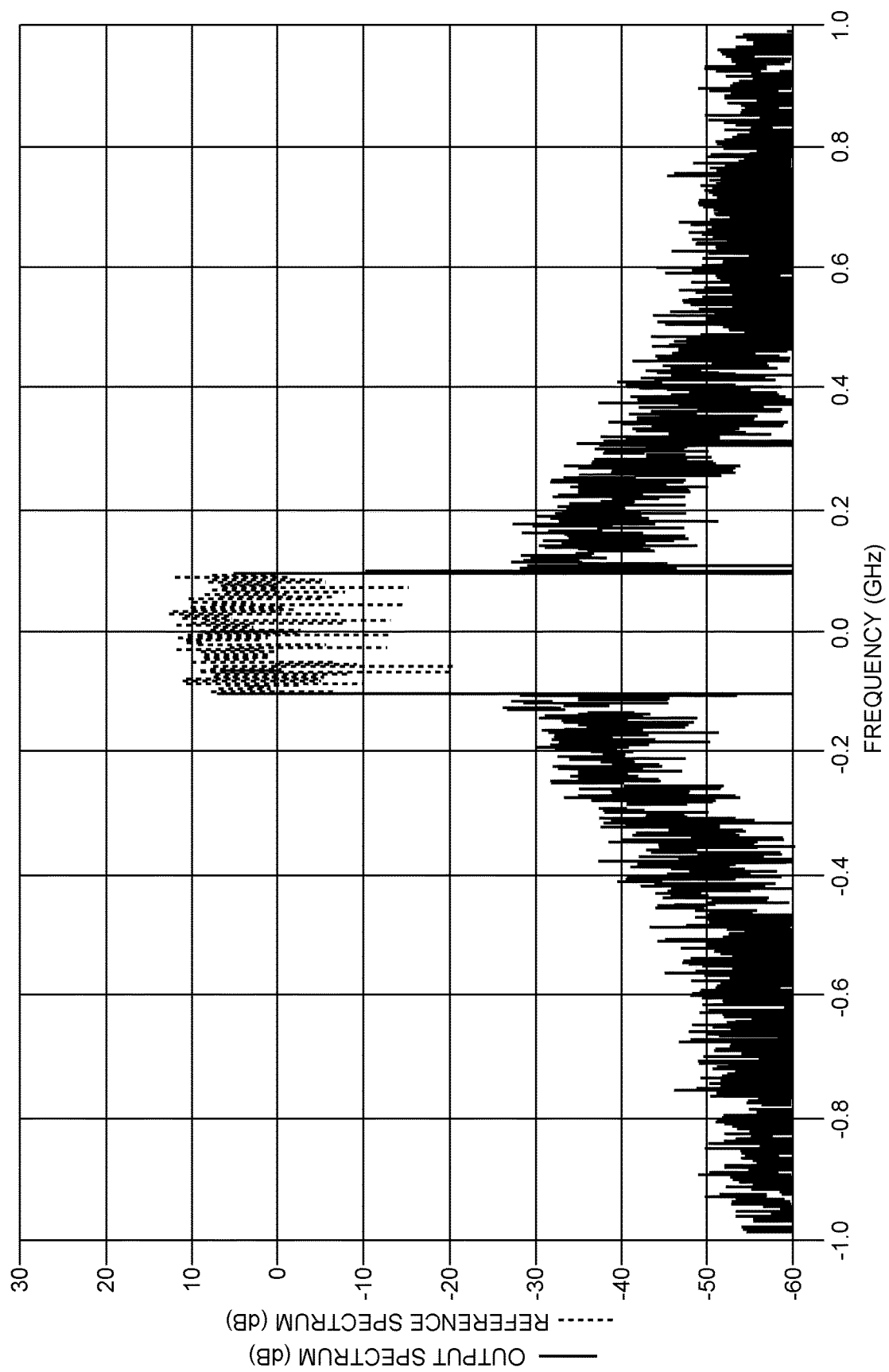
FIGS. 9A and 9B show an envelope tracking performance at 200 MHz without parasitics.
Figure 9B:
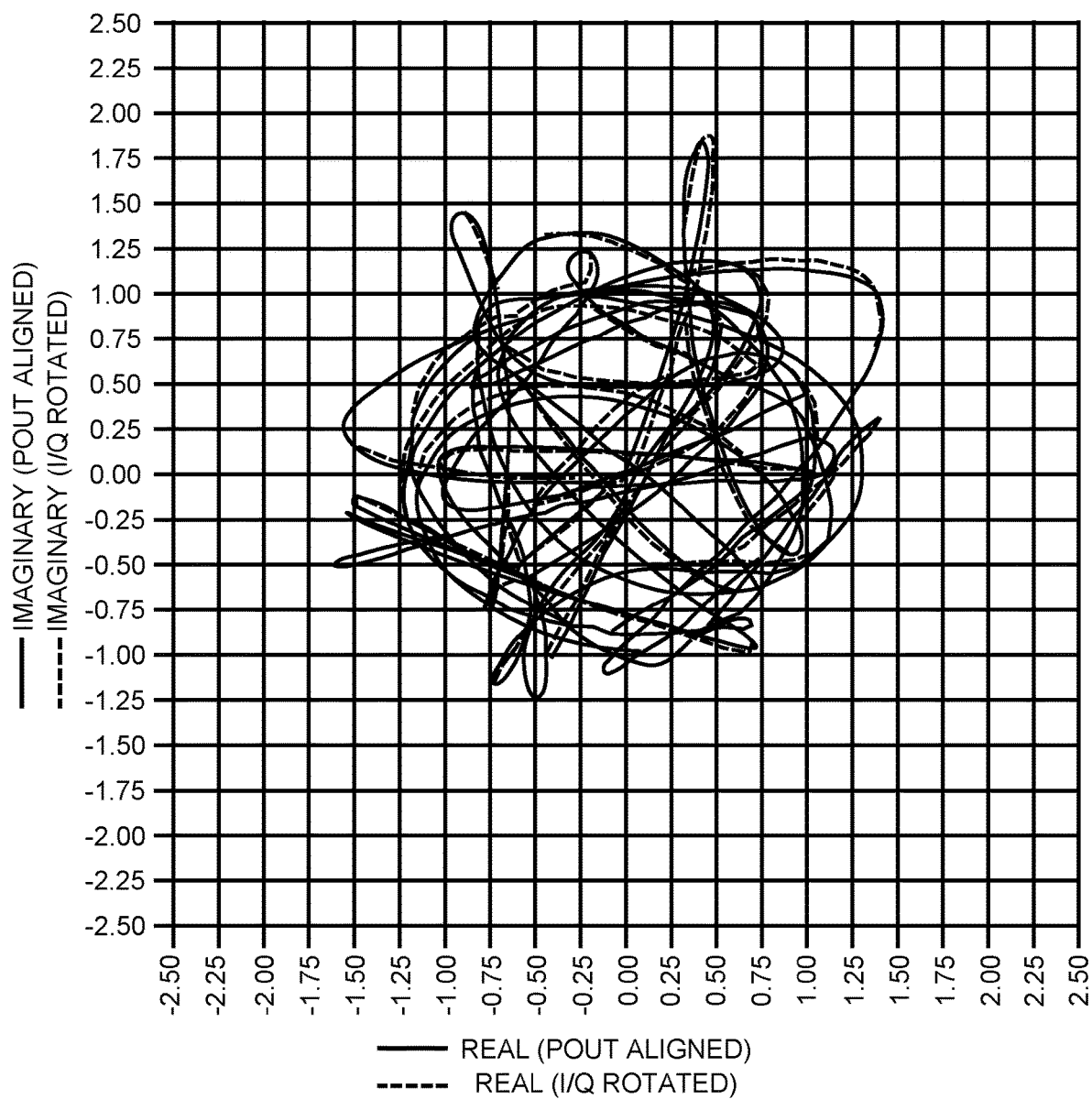

The plots in FIGS. 9A and 9B show results of a simulation of ET performance at 200 MHz using a power amplifier with only nonlinear collect-base capacitance effects compensated. Performance is roughly −41.3 dBc at an EVM of 1.6%.

Figure 9C:
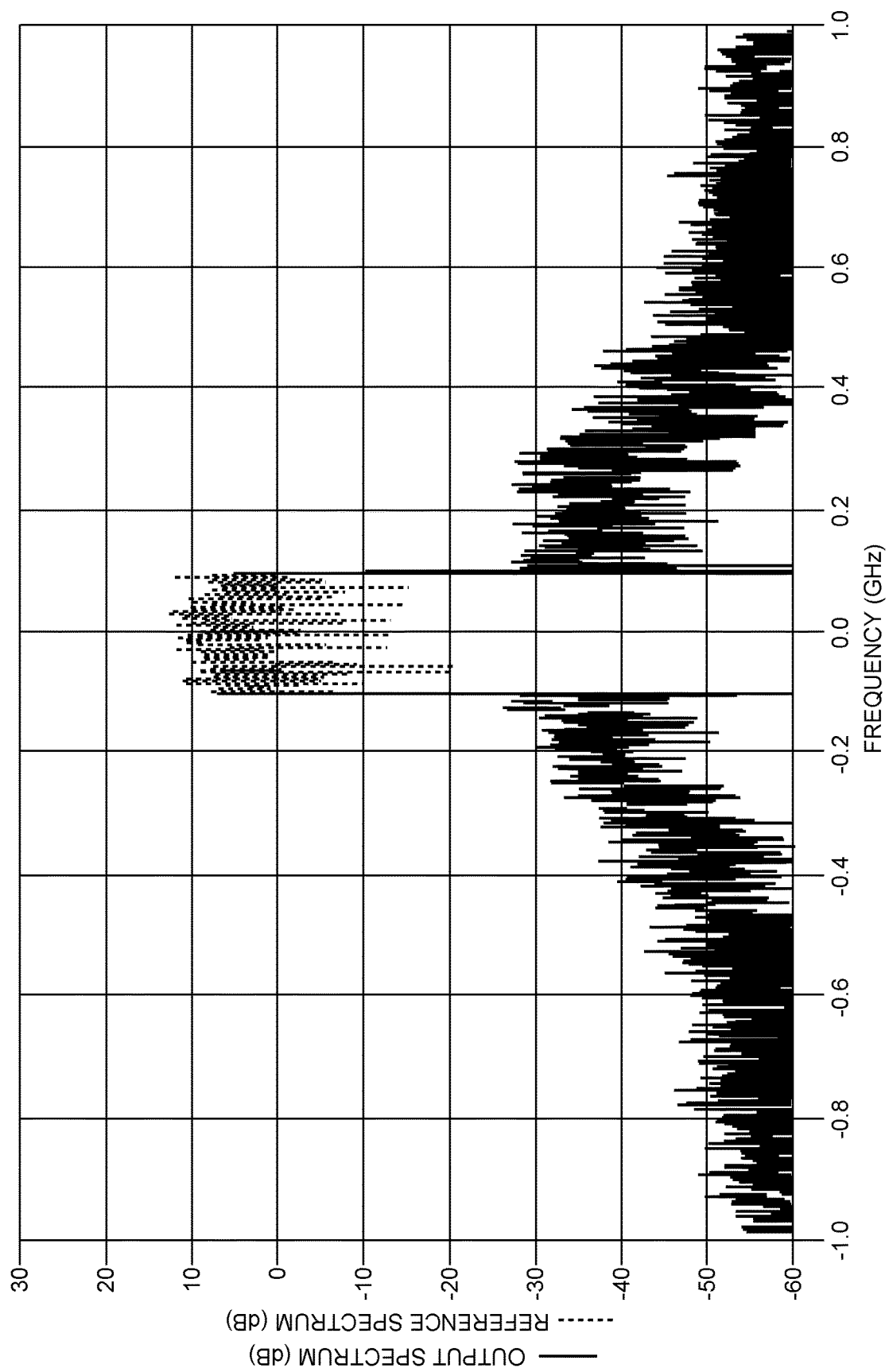
FIGS. 9C and 9D show an envelope tracking performance at 200 MHz with parasitics.
Figure 9D:
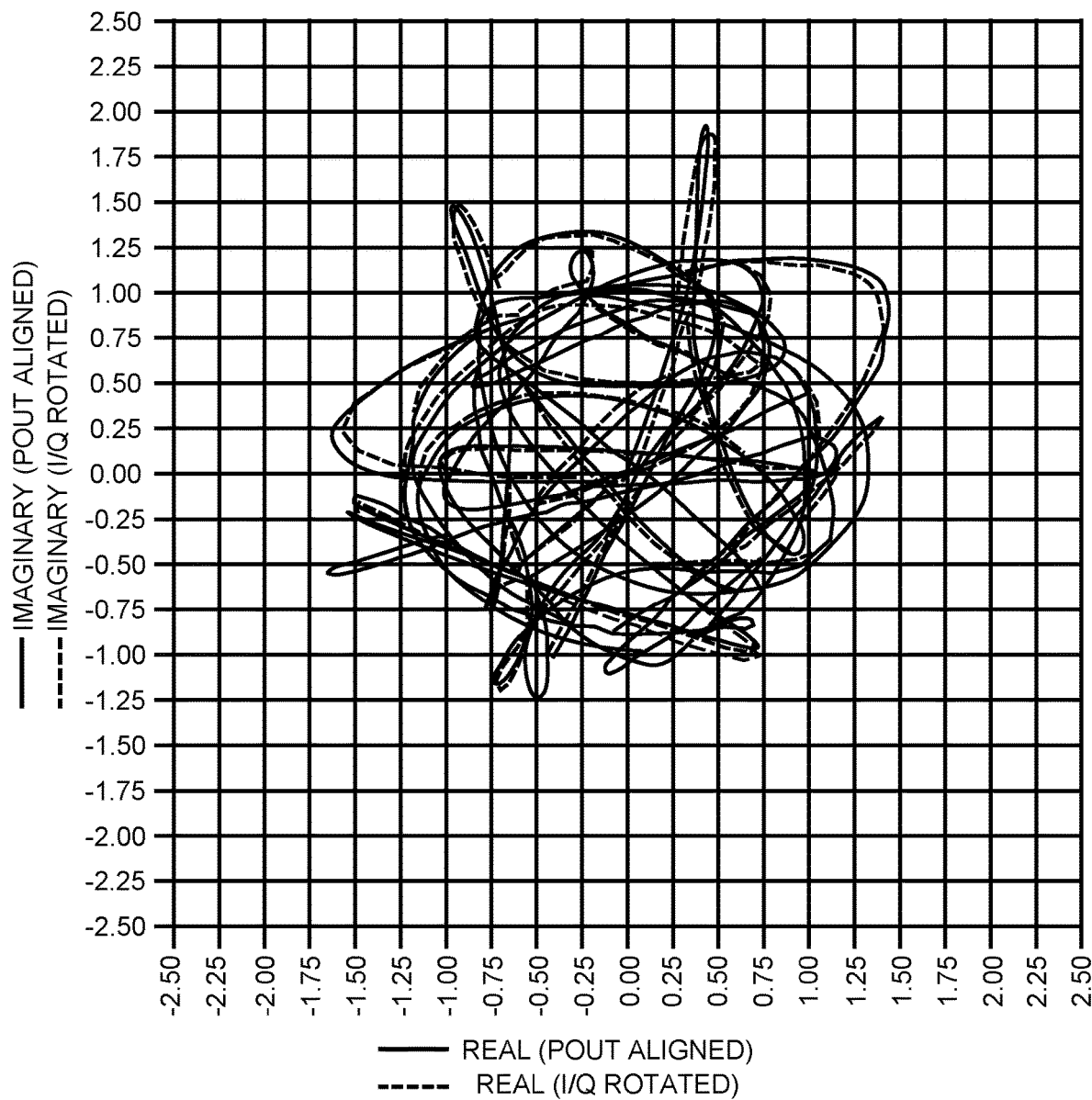

The plots in FIGS. 9C and 9D add 0.6 nH of evaluation trace inductance in series with all collector feeds and assume one half the output impedance of the envelope tracking circuitry 12. Note from the schematic of FIG. 1 that there are two parallel amplifiers (e.g., the first tracking amplifier 42A and the second tracking amplifier 42B) supplying each phase of the output stage 22 and carrying half the original current, thus the assumption that architecture could be designed for one half the output impedance. Performance in this case is −40.8 dBc at an EVM of ~2.1%. Note that the results are phase aligned with an accuracy around 0.5°, and some residual error in error vector magnitude prediction that is always at maximum may be recoverable. The point shows that linearity may be recovered even with substantial realistic system imperfections by using the disclosed compensation techniques. Also note that in these simulations only a single modulated voltage is applied for $V_{CC1}$ at the center tap of an interstage transformer (not shown), which doubles as the bias feed for the driver stage.

Figure 10:
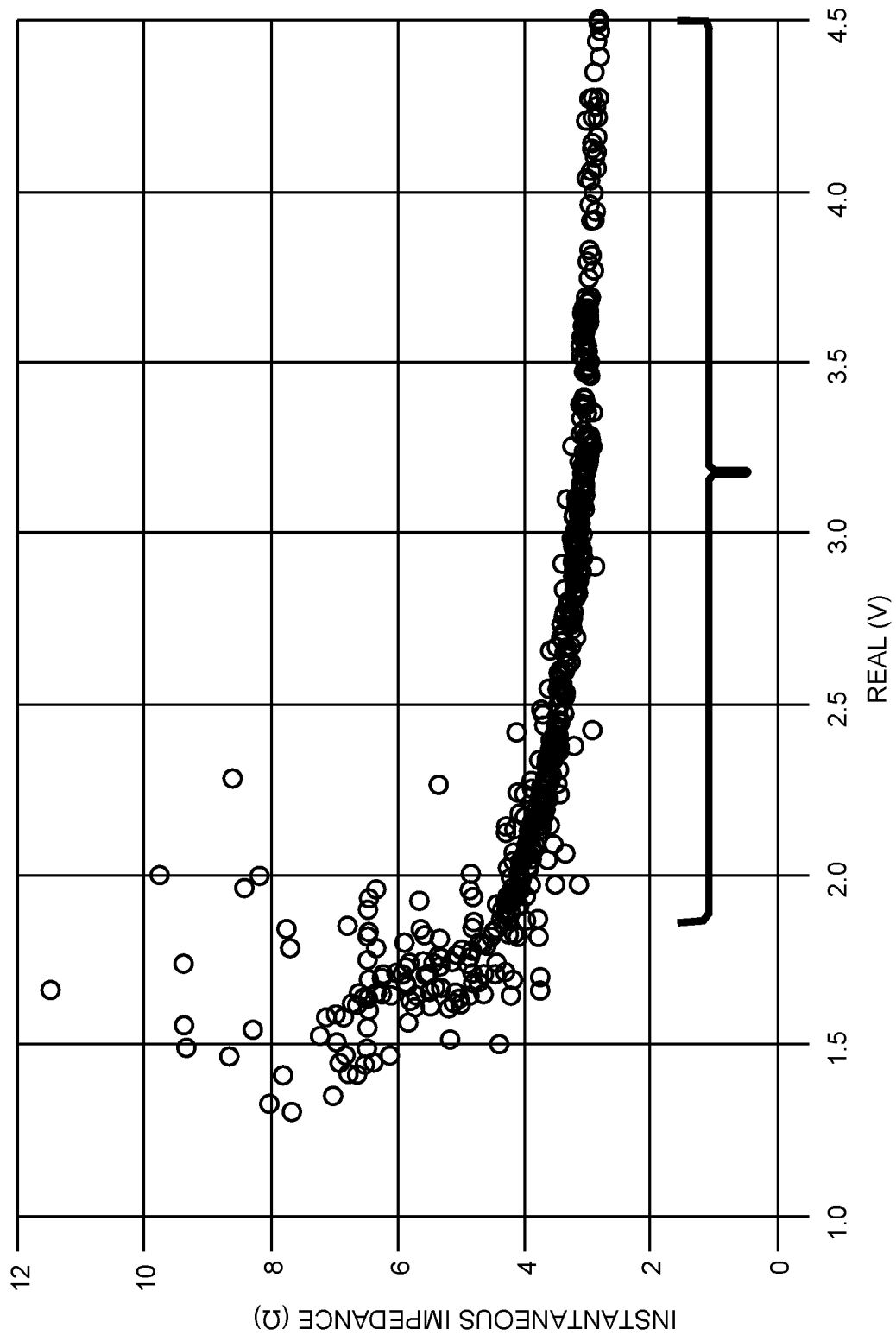
FIG. 10 is a plot showing the potential improvements to evaluation board inductance compensation.

The foregoing disclosure assumes a linear fit between power amplifier voltage and current when the impedance increases nonlinearly as voltage decreases. FIG. 10 plots this effect and shows that the parasitic voltage drop prediction accuracy can be improved if a nonlinear model is implemented. The bracket shows roughly the range over which a resistive model is reasonably accurate. Modeling nonlinear behavior increases system complexity and baseband modulator bandwidth.

Thus, the envelope tracking system 10 and methods according to the present disclosure enable envelope tracking for very large modulation bandwidth such as envelope tracking at 200 MHz and above. The relative delay between $V_{CC1}$ and $V_{CC2}$ is accomplished by modifying the VRF equalizer settings and the parallel amplifier settings of the first tracking amplifier 42A and the second tracking amplifier 42B for each $V_{CC1}$ and $V_{CC2}$ as small delays of less than 0.4 µs to 0.8 µs are needed. For modulation bandwidths that are low enough that make them less sensitive to $V_{CC1}/V_{CC2}$ delay mismatch, the envelope tracking circuitry 12 can be configured to operate a single $V_{CC}$ where both $V_{CC1}$ and $V_{CC2}$ have the same voltage modulation and where the switch of the multifunctional circuit 34 is configured as a closed switch.

Figure 11:
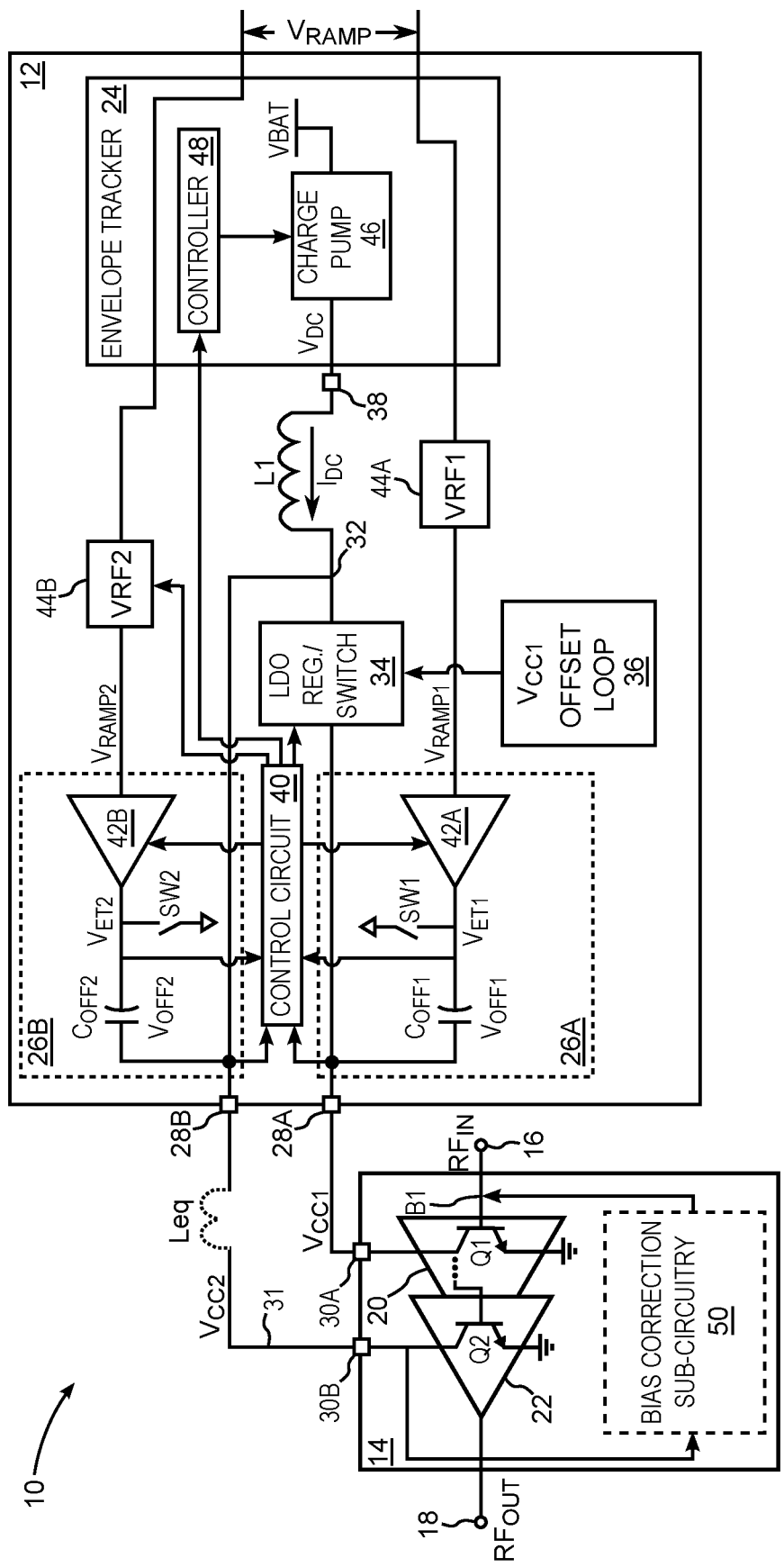
FIG. 11 is a schematic of a second embodiment of an architecture for very wide modulation transmitter envelope tracking.

FIG. 11 is a schematic of a second embodiment of the envelope tracking system 10 for very wide modulation transmitter envelope tracking. In this second embodiment, the power amplifier 14 is an integrated circuit in which the bias correction sub-circuitry 50 is integrated. In this example, the bias correction sub-circuitry 50 may comprise the same elements and structure as the detailed depiction of the bias correction sub-circuitry depicted in FIG. 1.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. An envelope tracking system comprising:
   a radio frequency (RF) power amplifier comprising a driver stage and an output stage; and
   envelope tracking circuitry comprising:
      a first voltage equalizer circuit configured to generate a first target modulation voltage based on a common target modulation voltage; and
      a second voltage equalizer circuit configured to generate a second target modulation voltage based on the common target modulation voltage, wherein at least one of the first voltage equalizer circuit and the second voltage equalizer circuit is further configured to delay the first target modulation voltage relative to the second target modulation voltage based on a determined temporal delay between the driver stage and an output stage.

2. The envelope tracking system of claim 1 wherein the driver stage comprises a driver transistor having a base, an emitter, and a collector.

3. The envelope tracking system of claim 2 further comprising:
   bias correction sub-circuitry configured to generate a compensation current substantially opposite in phase and substantially equal in magnitude to an error current passed by a parasitic base-collector capacitance inherently coupled between the base and collector, wherein the bias correction sub-circuitry has a compensation output coupled to the base and through which the compensation current flows to substantially cancel the error current.

4. The envelope tracking system of claim 3 wherein the bias correction sub-circuitry comprises:
   a first bias transistor having a first bias collector coupled to a base of the driver transistor, and a first bias emitter coupled to a fixed voltage node, and a first bias base; and
   an offset capacitor coupled between the collector of the driver transistor and the first bias base.

5. The envelope tracking system of claim 4 wherein the fixed voltage node is ground.

6. The envelope tracking system of claim 4 further including a second bias transistor having a second bias collector coupled to a direct current supply voltage, and a second bias emitter coupled to the first bias collector of the first bias transistor to form an emitter-follower configuration.

7. The envelope tracking system of claim 6 further including a diode stack configured to generate a reference voltage for the emitter-follower configuration.

8. The envelope tracking system of claim 4 wherein the offset capacitor has a capacitance within 10% of a parasitic base-collector capacitance of the driver transistor divided by a current gain of the driver transistor.

9. The envelope tracking system of claim 4 further including a resistor coupled between the first bias collector and first bias base of the first bias transistor.

10. The envelope tracking system of claim 3 wherein the bias correction sub-circuitry is integrated with the RF power amplifier.

11. The envelope tracking system of claim 1 wherein the envelope tracking circuitry further comprises:

a first tracking circuit configured to generate a first supply voltage at the collector of a driver transistor, wherein the first supply voltage is based on the first target modulation voltage; and a second tracking circuit configured to generate a second supply voltage at a tracking output terminal coupled through an interconnect to a supply terminal of the output stage, wherein the second supply voltage is based on the second target modulation voltage.

12. The envelope tracking system of claim 11 wherein the second tracking circuit is further configured to change the second supply voltage by an amount that substantially cancels instantaneous parasitic inductance voltage drops across the interconnect.

13. The envelope tracking system of claim 12 wherein the amount of change of the second supply voltage is equal to an equivalent inductance value of the interconnect multiplied by a multiplication factor.

14. The envelope tracking system of claim 12 wherein the amount of change is equal to an equivalent inductance value of the interconnect multiplied by a first multiplication factor and a first supply current multiplied by an equivalent resistance of the interconnect.

15. The envelope tracking system of claim 11 wherein the first tracking circuit comprises:
a first tracking amplifier configured to generate a first envelope tracking voltage at a first tracking output based on the first target modulation voltage; and
a first offset capacitor coupled between the first tracking output and the collector of the driver transistor, wherein the first offset capacitor is configured to change the first target modulation voltage by a first offset voltage to generate the first supply voltage.

16. The envelope tracking system of claim 15 wherein the second tracking circuit comprises:
a second tracking amplifier configured to generate a second envelope tracking voltage at a second tracking output based on the second target modulation voltage; and
a second offset capacitor coupled between the second tracking output and the tracking voltage terminal, wherein the second offset capacitor is configured to change the second target modulation voltage by a second offset voltage to generate the second supply voltage.

17. The envelope tracking system of claim 16 wherein the second tracking amplifier is further configured to change the second supply voltage by an amount that substantially cancels instantaneous parasitic inductance voltage drops across the interconnect.

18. The envelope tracking system of claim 17 wherein the amount of change is equal to an equivalent inductance value of the interconnect multiplied by a multiplication factor.

19. The envelope tracking system of claim 11 further comprising an envelope tracker comprising:
a charge pump configured to generate a low-frequency voltage based on a battery voltage; and
and a controller configured to adjust the low-frequency voltage and a low-frequency current based on a feedback signal.

20. The envelope tracking system of claim 19 wherein the charge pump is a multi-level type charge pump configured to provide different levels of output voltage based on the battery voltage.

21. The envelope tracking system of claim 19 further comprising a power inductor configured to filter the low-frequency current and low-frequency voltage, wherein the power inductor is coupled between the charge pump and a supply node.

22. The envelope tracking system of claim 19 further comprising a control circuit coupled to the first tracking amplifier, the second tracking amplifier, and the controller, wherein the control circuit is configured to:
activate the first tracking amplifier to generate the first supply voltage and the second tracking amplifier to generate the second supply voltage; and
provide feedback to the controller based on the first supply voltage and the second supply voltage.

* * * * *